Sept. 15, 1970  S. M. WEIR  3,528,566
WAREHOUSE ARTICLE TRANSPORT VEHICLE WITH HORIZONTAL
AND INCLINED CONVEYORS
Filed Sept. 4, 1968  4 Sheets-Sheet 1
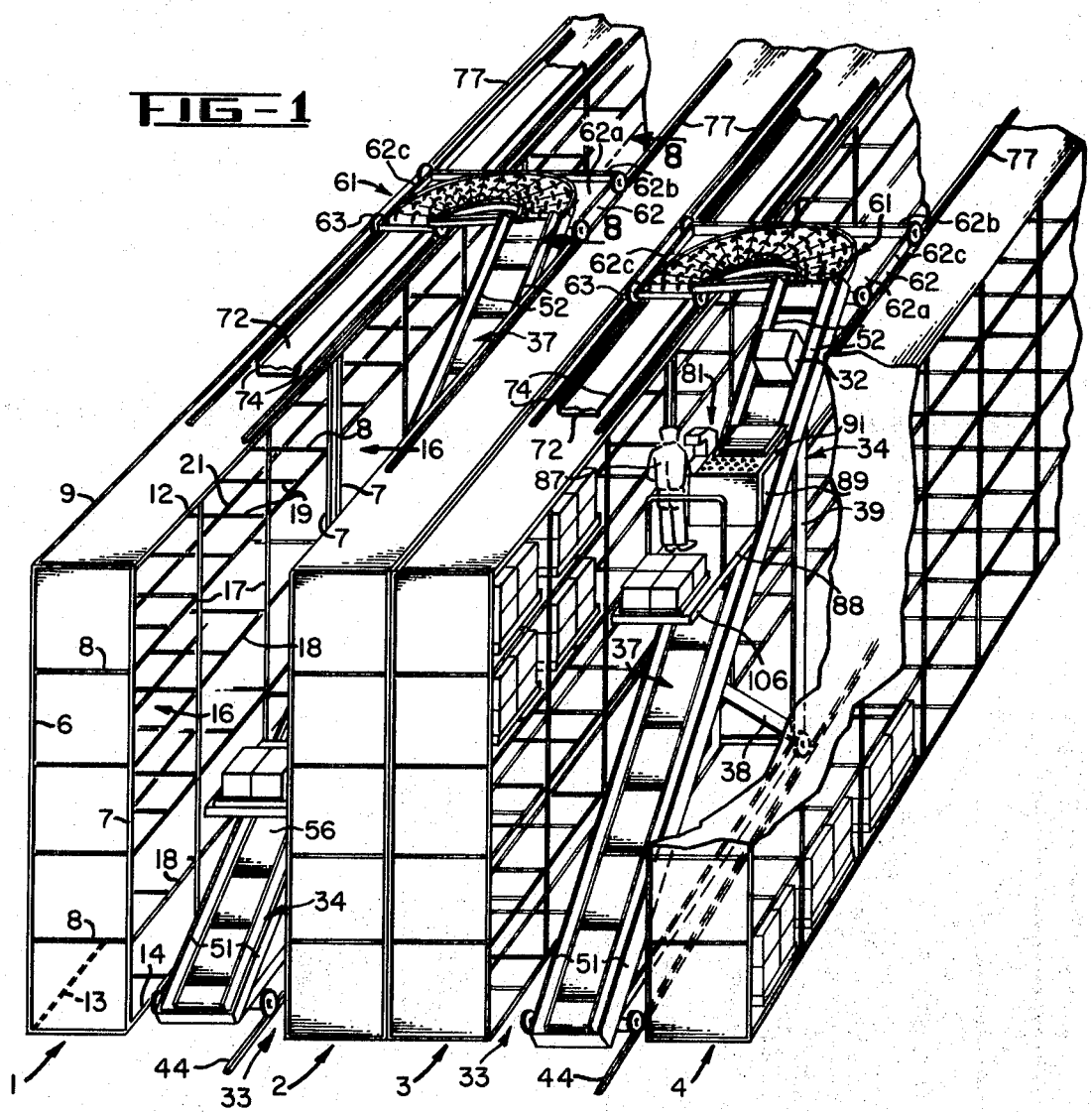
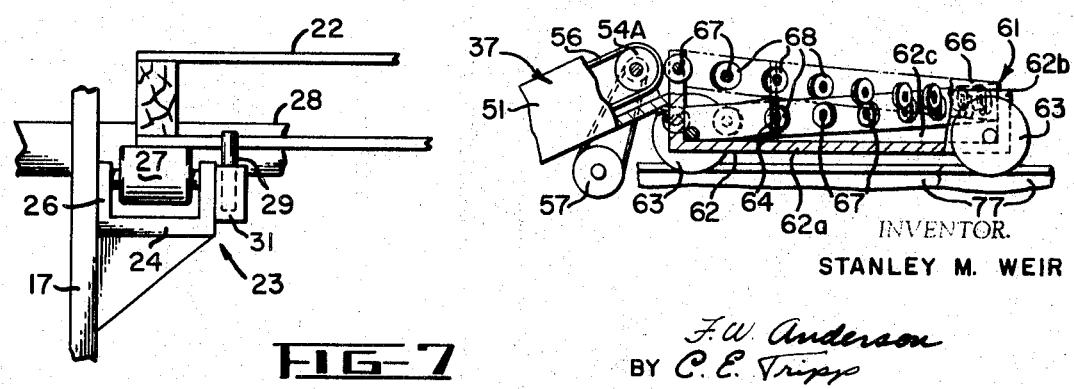
INVENTOR.
STANLEY M. WEIR
BY F.W. Anderson
C.E. Tripp
ATTORNEYS

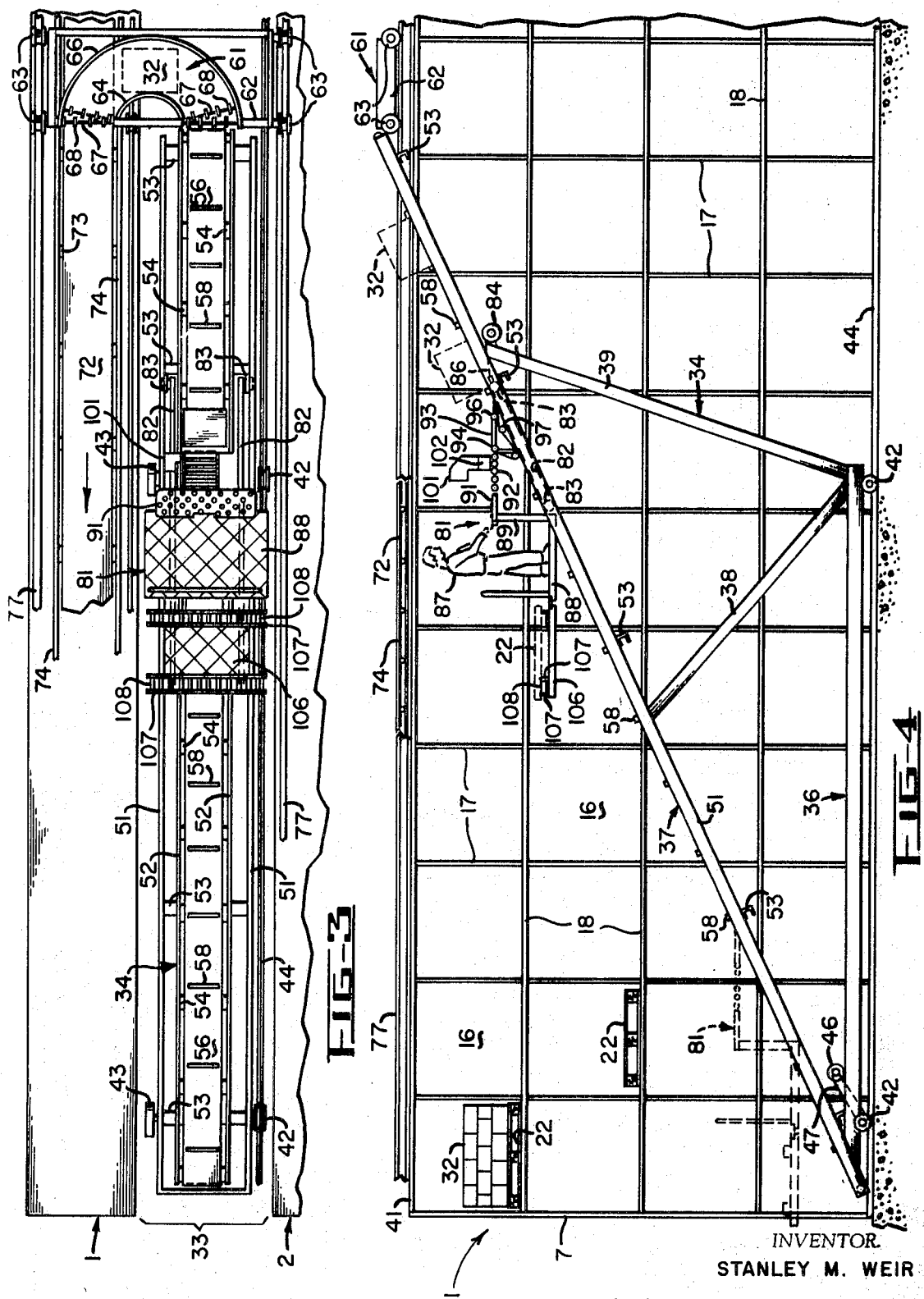

Sept. 15, 1970   S. M. WEIR   3,528,566
WAREHOUSE ARTICLE TRANSPORT VEHICLE WITH HORIZONTAL
AND INCLINED CONVEYORS
Filed Sept. 4, 1968   4 Sheets-Sheet 4
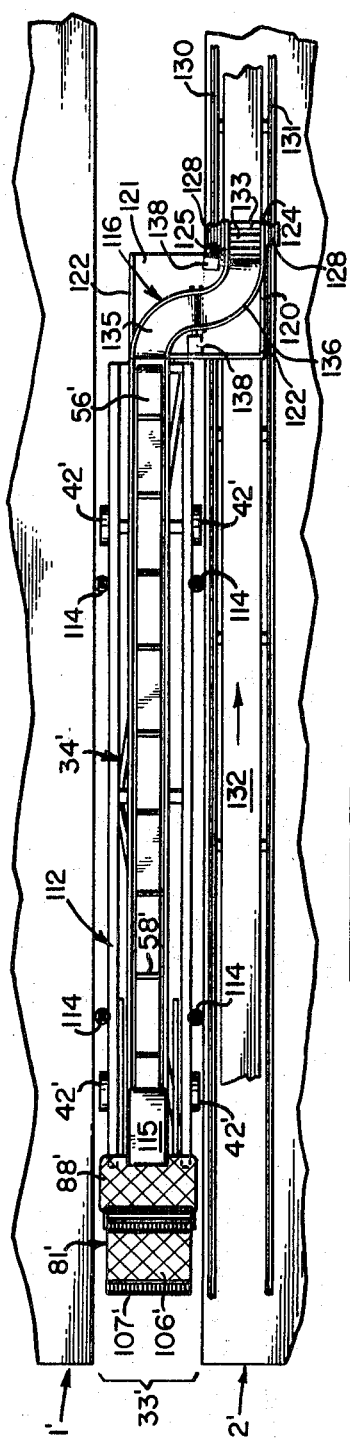
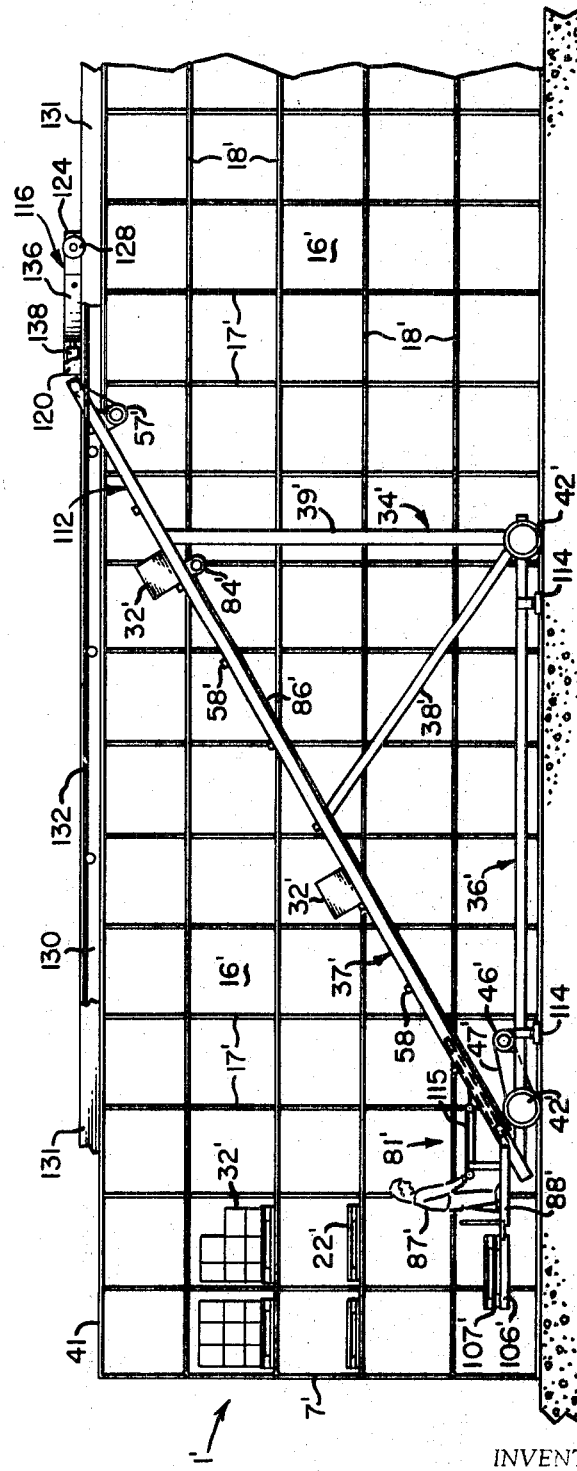
INVENTOR.
STANLEY M. WEIR
F. W. Anderson
BY C. E. Tripp
ATTORNEYS United States Patent Office 3,528,566
Patented Sept. 15, 1970

3,528,566
WAREHOUSE ARTICLE TRANSPORT VEHICLE WITH HORIZONTAL AND INCLINED CONVEYORS
Stanley M. Weir, Palo Alto, Calif., assignor to FMC Corporation, San Jose, Calif., a corporation of Delaware
Filed Sept. 4, 1968, Ser. No. 757,299
Int. Cl. B65g 1/00
U.S. Cl. 214—16.4                    9 Claims

ABSTRACT OF THE DISCLOSURE

A storage rack and article transport system is provided in which a modular storage rack is arranged with bins opening on a passageway or aisle, the bins being arranged to receive palletized loads of containers. Pallets may be deposited in the bins either from the aisle side of the bin or from the rear side thereof. A mobile carriage moves along the aisle in front of the rack, and is provided with an inclined elevator to receive containers taken from the bins by a workman standing at a work station which is also mounted on the carriage. The work station is adapted to move relative to the racks in both a vertical and horizontal direction. Containers placed on the inclined elevator by the workman standing at the work station are carried upwardly and deposited on a main conveyor or transport system which carries the containers away from the storage area. The work station supported on the mobile carriage includes a pallet platform having parallel assemblies of rollers thereon to support a pallet. The pallet platform may be used to deliver pallets loaded with containers to specific bins, or it may be used as a means of temporarily storing empty pallets removed from bins.

BACKGROUND OF THE INVENTION

The manner of handling goods in commerce has changed in the recent past. Formerly, containers within which goods were packed were stacked seven or eight high and were handled by hand with a push-type "warehouse truck" each of which required the presonal attention of an operator. Modernly, the volume of goods being handled has required that other means and methods be utilized to handle goods in commerce. Such means and methods have included warehouse systems utilizing complicated conveyor belts, elevators and motorized vehicles to deliver goods to be stored to storage areas and to distribute goods from storage to sorting areas for transport to ultimate consumers. Such sophisticated warehousing systems are expensive and can be justified only where the volume of goods being handled is so large that the savings in labor, time, convenience and accuracy offset the cost of installation.

Modern merchandising methods utilizing strategrically located supermarkets designed to expose a maximum amount of product to a maximum number of people within a predetermined radius require that a central warehousing complex be utilized to receive, sort and store in organized fashion many hundreds of different commodities. Commodities from these warehousing complexes are then distributed to a multiplicity of stores comprising a chain, the manager of each store in the chain drawing commodities from the centralized warehousing complex as the need arises. To handle the large volume of requests for commodities to be delivered from such warehousing complexes, it has become conventional to utilize computer techniques and equipment to the extent that orders from many different stores and for many different commodities are converted into data which may be printed on labels, the labels being arranged in rolls, and the data on each of the labels being correlated to the information required by a workman to select individual containers from specified bins. The labels may also contain data designed to initiate automatic equipment to sort specific containers in correlation to its destination. It is therefore another important object of the invention to provide a storage rack and transport system for a warehouse which is compatible with such computerized ordering techniques.

The invention possesses other objects and features of advantage, some of which, with the foregoing, will be apparent from the following description and the drawings.

It is to be understood however that the invention is not limited to the embodiment illustrated and described, as variant forms may be embodied within the scope of the appended claims.

SUMMARY OF INVENTION

In terms of broad inclusion, the storage rack and transport system for warehouses forming the subject matter of this invention comprises a framelike modular storage rack fabricated from srtuctural iron, the rack being divided into bins proportioned to receive and support a pallet loaded with containers packed with a specific commodity. The invention has particular utility in relation to foodstuffs and staples sold in grocery stores and supermarkets, and pallet-loads may thus comprise cartons of soap chips, cases of canned goods and a variety of other products. Preferably, each palletload is limited to a single commodity. In one aspect of the invention the storage rack is fabricated so that it may be loaded from the rear side thereof and arranged so that individual containers may be taken from the pallets from the front side of the storage rack.

In another aspect of the invention the rack may be fabricated so that pallets loaded with containers may be deposited in bins from both sides of the rack. Preferably, in order to utilize a given floor space as economically as possible, a plurality of racks are arranged in parallel relation so as to define an aisle or passageway therebetween. However, the invention may be utilized where only one elongated rack is provided.

In either aspect, a first transport system in the form of an endless belt type conveyor is mounted above the rack and operates to carry containers away from the storage area and to an appropriate sorting area. Where a plurality of parallel arranged racks are utilized, such a main transport system or conveyor need be positioned only over alternate racks. Thus, in a group of four such racks, only two transport conveyors need be used to carry containers away from the storage racks.

To select containers from individual bins, a mobile carriage is adapted to move up and down the aisle or passageway in front of a rack. The mobile carriage is provided with a belt conveyor extending for the entire height of the rack, and is additionally provided with a mobile work station movably mounted on the mobile carriage so as to move vertically and horizontally with respect to the rack and with respect to the mobile carriage. The mobile work station is preferably provided with a work platform on which a workman may stand, and is further provided with viewing and labeling apparatus so that commodities to be selected from bins by the workman are displayed on an appropriate screen visible by the workman, and containers selected are appropriately labeled in correlation to the label displayed and destination of the container. The mobile work station is also provided with a pallet platform which may be utilized to carry pallets loaded with containers to and deposit them in bins, or which may be utilized to temporarily support empty pallets taken from empty bins. Mobility of both the carriage and work station thereon is under the close control of the workman standing on the work platform of the mobile work station.

BRIEF DESCRIPTION OF DRAWINGS

FIG. 1 is a schematic perspective view illustrating one embodiment of the invention in a warehouse system which utilizes the mobile carriage of the invention for loading the bins with palletloads and for selecting, from specific bins, containers of commodities that have been ordered for delivery to various consumer outlets.

FIG. 3 is a fragmentary, schematic plan view of a pair of racks arranged to provide a passageway therebetween and illustrating a mobile carriage in position between the racks.

FIG. 4 is a schematic side elevation of the apparatus of FIG. 3, one rack being removed to more clearly disclose the carriage.

FIG. 5 is a schematic side elevation, similar to FIG. 4, but illustrating a different embodiment of the mobile carriage.

FIG. 6 is a schematic plan view of a pair of racks arranged to provide a passageway and illustrating the mobile carriage of FIG. 5 disposed in the passageway.

FIG. 7 is an enlarged fragmentary view in elevation illustrating one form of a roller construction for the racks of FIGS. 1–6.

FIG. 8 is an enlarged vertical section taken along line 8—8 of FIG. 1.

DESCRIPTION OF PREFERRRED EMBODIMENT

Figure 2:
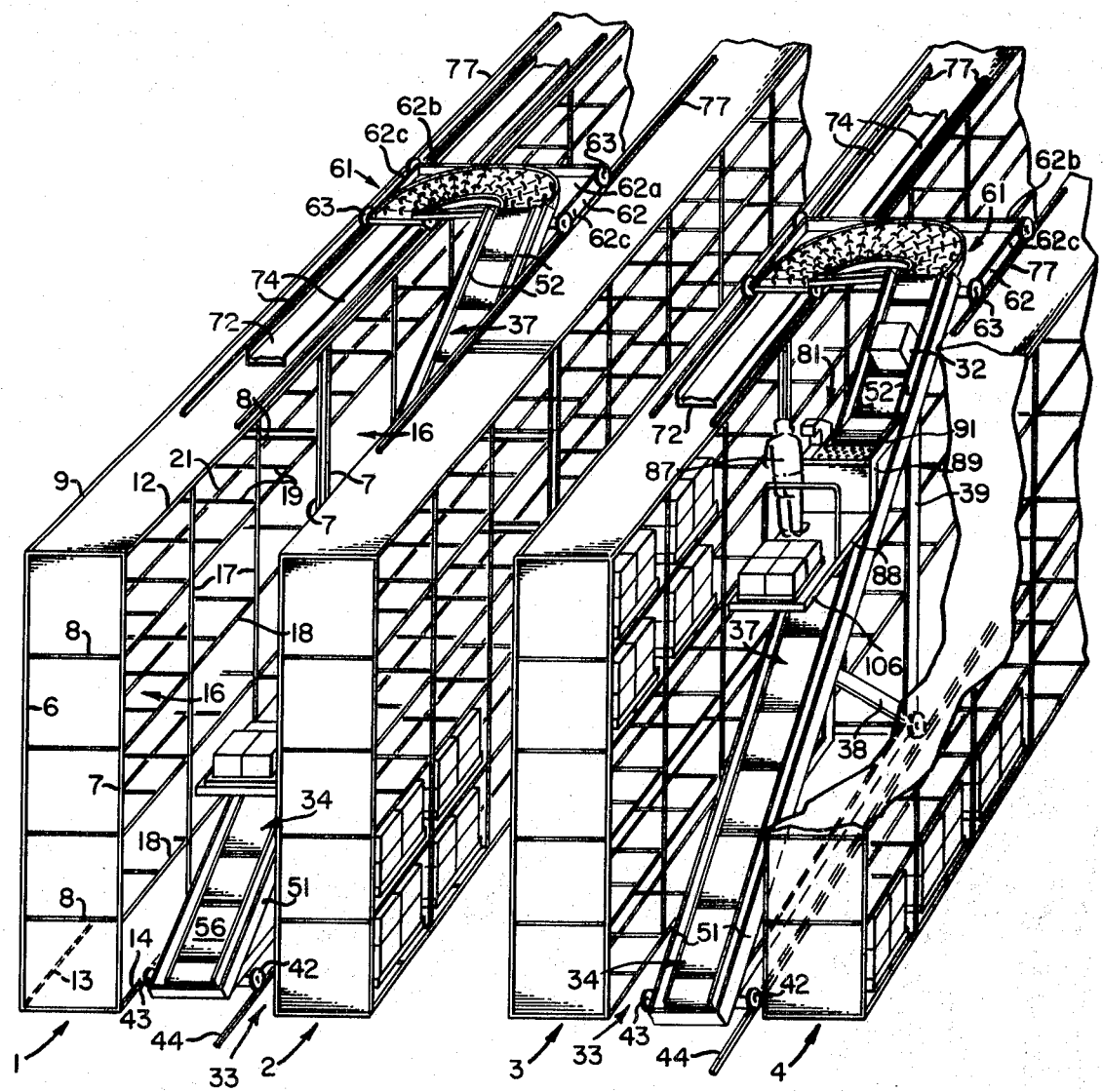
FIG. 2 is a schematic perspective view illustrating another embodiment of the invention in a warehousing system in which the storage racks are arranged for loading of the bins from the rear side of the racks through use of a motorized vehicle or forklift truck.

At the outset it should be understood that storage racks used in conjunction with the present invention may be arranged in the positions illustrated in FIG. 1, or they may be arranged in the positions illustrated in FIG. 2. Regardless of which arrangement is utilized, the construction of the mobile carriage utilized in conjunction with the racks may remain the same.

The preferred embodiment is illustrated in FIG. 1, and possesses the advantage that the mobile carriage performs a double function in that it is utilized both for loading the bins with pallet-sized lots of containers, and for selecting individual containers from specified bins for delivery to a sorting area.

In the embodiment illustrated in FIG. 2, the mobile carriage is utilized only for the latter function; the stocking or filling of the bins with pallet-sized lots of containers is effected through use of a forklift or similar type device. A second advantage flowing from the embodiment illustrated in FIG. 1 is that less floor space is required for a given number of racks, thus making better use of expensive space.

For brevity and clarity in the description, the invention will be described in relation to utilization of only a single rack or a pair of storage racks arranged to provide a passageway therebetween. Thus, referring specifically to FIGS. 1 and 2, there is there shown four storage racks generally designated by the numerals 1, 2, 3 and 4.

Each of the storage racks is preferably fabricated from structural iron having any convenient configuration. It has been found that I-beams and T-bars of appropriate size may be utilized to good advantage. As illustrated best in FIG. 1, each rack is formed with vertical end posts 6 and 7 arranged in parallel and interconnected intermediate their ends by horizontal crosspieces 8. The posts and crosspieces thus form a rigid framework at each end of the storage rack which are connected by longitudinally extending horizontal stringers 9 and 12 at the top thereof and 13 and 14 at the bottom thereof to tie the two end frames together.

Intermediate the end frames and between top and bottom rails each rack is divided into a plurality of separate bins here designated generally by the numeral 16. The bins are preferably arranged in longitudinal series, with each series forming a module. If desired, relatively short horizontal series of bins may be arranged one above the other as indicated best in FIGS. 1 and 3, to provide racks of any desired height. In FIGS. 1, 2 and 3 the racks are illustrated as being five bins high. If desired, each series of bins, whether in individual form or in a grouping as shown in FIGS. 1, 2 and 3, may be limited in length to three, four or five bins so that the group forms a module. Each module then, whether it consists of a single horizontal series of bins, or a grouping of a plurality of series arranged one above the other, may be moved about and arranged to suit the convenience of the floor space which is to support the storage racks.

In each of the racks, the bins are formed by pairs of vertical posts 17 extending between top rail 9 and bottom rail 13, and between top rail 12 and bottom rail 14. The posts are spaced horizontally an appropriate distance to accept the full width of a pallet as best illustrated in FIGS. 4 and 5. Spaced vertically across the front and rear of each of the racks are a plurality of horizontal stringers 18 shown best in FIG. 1. The face of each bin is therefore defined by a pair of parallel horizontal stringers 18 and a pair of vertical parallel posts 19. While this construction would form a very rigid framework, means must be provided within each of the bins to support a pallet placed therein. For this purpose, horizontal cross members 19 are provided connecting each of the horizontal stringers 18 front and back, with alternate horizontal cross members 19 being positioned at the juncture of each of the horizontal stringers 18 with a post 17.

To provide additional support for pallets placed within each of the bins, longitudinally extending braces 21 connect the cross members 19 at a position midway between the front and back of each of the racks. This construction is best seen in FIG. 1. It will thus be seen that each of the bins is provided with a floor in the form of a rectangular frame within which are provided cross-beams having their ends joining the rectangular framework at the midpoints of the sides.

Figure 9:
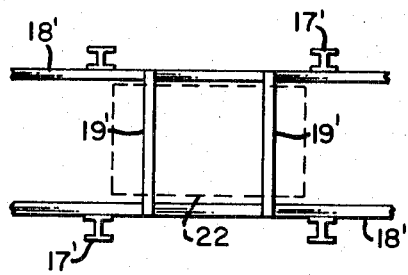
FIG. 9 is a fragmentary horizontal sectional view illustrating a preferred rack construction where bins are to be filled from the rear side of the rack.

An alternate construction is illustrated in FIG. 9 in which the cross members 19' join the horizontal stringers 18' at intervals spaced between the vertical posts 17' so as to uniformly support a pallet 22 thereon. This construction clearly eliminates the need for the intermediate brace pieces 21, thus saving material and construction costs. These two constructions are particularly applicable in the form of racks illustrated in FIG. 2.

Where storage racks are to be arranged in the pattern illustrated in FIG. 1, so that the bins may be loaded from the front side thereof, it is preferred that each of the bins be provided with a roller assembly designated generally by the numeral 23 (FIG. 7) and comprising a channel 24 extending transversely across the depth of the rack, and having one of its webs welded or otherwise secured to the adjacent vertical posts 17. Arranged in series along the channel, and appropriately journaled on the upstanding webs 26, are a pluarlity of rollers 27 arranged to rollably support the pallet. In this construction, a bar 28 is provided at the read side of each of the racks and along each of the series of bins to form an abutment against which the pallet may come to rest when the pallet is deposited in the bin. To insure that the pallet will remain in the bin without rolling forwardly on the rollers 27, a removable lock pin 29 is provided seated in any appropriate form of socket 31 so as to form an abutment retaining the pallet in the bin.

Referring now to FIG. 4, the pallets are supported within each of the bins, each bin being designated to receive a specific commodity. The pallets are preferably loaded with containers 32, each container being packed with a specific commodity. Where the storage racks are arranged as illustrated in FIG. 2, each of the bins is adapted to be loaded from the rear side thereof by use of a forklift truck. Individual containers are then removed from selected bins from the front side thereof and transported to a sorting area by a transport system which will hereinafter be described in detail.

Considering the area immediately in front of each of the storage racks as an aisle 33 FIG. 3, there is positioned within such aisle, and adapted to move back and forth therealong, a mobile carriage designated generally by the numeral 34. The mobile carriage is conveniently fabricated from structural iron and comprises a base frame designated generally by the numeral 36, an inclined elevator and ramp frame designated generally by the numeral 37, and suuport struts 38 and 39 which support the ramp and elevator frame 37 in an inclined position with respect to the base frame 36.

As shown best in FIG. 4, the inclined ramp and elevator frame 37 is proportioned in length to extend from the lowermost series of bins 16 past the upper edge 41 of the storage rack. To lend mobility to the carriage, sets of wheels 42 and 43 are provided on opposite sides of the base frame 36. As shown in FIG. 3, each of the wheels 42 is preferably formed with a V-groove therein, and is adapted to be guided along the aisle 33 by an elongated rail 44 which may be in the form of an angle bar turned so as to present the apex of the angle for engagement by the wheels. It will thus be seen that, as the mobile carriage moves along the aisle, it is guided in such movement so that it follows a straight path.

Each of the wheels 43 may be a standard iron or rubber tired wheel. Motive power for the carriage is derived from a motor 46 (FIG. 4), under the control of an operator riding on the carriage as will hereinafter be explained in greater detail. The motor is connected through an appropriate chain or belt 47 to an axle to which one set of the wheels 42 and 43 is connected.

As indicated best in FIG. 3, the inclined ramp and elevator frame is fabricated from an outer pair of side rails 51, preferably in the form of inwardly turned channels, the channels of the side rails forming a ramp in a manner which will hereinafter be explained. Disposed between the side rails 51 and extending coextensive therewith and parallel thereto are a pair of conveyor frame rails 52. The conveyor frame rails 52 are spaced inwardly a short distance from side rails 51, both pairs of rails being rigidly attached to each other through cross channels 53.

The elevator conveyor rails 52 are utilized to support transverse rollers 54 on which is supported an endless belt 56, the roller 54A (FIG. 8) at the upper end of the elevator being driven by a motor 57. As shown best in FIG. 3, the belt 56 extends the full length of the conveyor or frame 37 and is provided at spaced intervals along its length with fixed cleats 58. The cleats project above the surface of the belt an amount sufficient to retain a container on the belt. It will of course be apparent that as many cleats may be provided on the belt as is required by the size of container being transported.

Containers reaching the upper end of the conveyor 56 as viewed in FIGS. 3 and 4 are deposited on a curved, gravity roller conveyor 61 which is supported on a carriage 62 that is secured by suitable connectors to the upper end of the inclined elevator 34. The carriage 62 (FIG. 8) has a floor 62a, and end wall 62b and side walls 62c all secured together to form a rigid structure. Stub axles projecting from the side walls rotatably support wheels 63. Rigidly supported on the carriage is a pair of parallel and arcuate frame members 64 and 66 between which are disposed a plurality of axially directed shafts 67, (only a few of which are shown in FIG. 3) each of which supports a plurality of free rollers 68.

The upper end of the conveyor extends above the upper edge of the storage rack. The amount by which the conveyor projects above the storage rack is sufficient to dispose the roller assembly at an incline with respect to the horizontal. The end of the frame members 64 and 66 remote from conveyor 34 lie at a level somewhat lower so that containers deposited on the roller or transition conveyor section roll downwardly by gravity and are deposited on a main transport means comprising an elongated endless belt conveyor 72.

The belt conveyor 72 is appropriately supported on conventional rollers 73 (FIG. 4) supported on side rails 74. The transport conveyor may conveniently be disposed above the storage rack 1 on its own supporting framework, or, as is preferred, the transport conveyor may be supported on the rack itself.

Inasmuch as the curved transition section 61 constituting the means by which containers are transported transversely from the elevator conveyor to the transport conveyor, moves along the aisle between the racks with the mobile carriage, guide rails 77 are provided to receive the wheels 63 which not only support the upper end of the inclined ramp and elevator frame, but serve also to guide the upper end of the carriage structure or transition section longitudinally along the racks.

It will thus be seen that the mobile carriage, including the inclined ramp and elevator frame, and the transition section 62 which transports containers transversely to the main transport conveyor 72, functions as a unit and may be moved along the aisle at will. It will also be evident that, with this construction, containers deposited on the transition section reverse their direction with respect to the direction in which they were moving when they are elevated to the transport conveyor. The transport conveyor of course carries the selected containers to an appropriate sorting area, details of which are clearly illustrated and described in co-pending application Ser. No. 530,057.

From the foregoing description of the storage rack assembly and design, and the cooperative relationship of the mobile carriage 34, it is apparent that any wide expanse of area may be quickly converted into an organized warehousing system through utilization of the storage racks and transport systems forming the subject matter of this invention. As previously indicated, the storage racks may be fabricated in any size consistent with material-handling equipment designed to handle pallets, and may be arranged in different patterns to accommodate more or less racks in a given space.

To deposit containers on the elevator conveyor 56, the mobile carriage 34 is provided with a work station designated generally by the numeral 81. The work station 81 is best shown in FIGS. 3 and 4, and as there shown comprises a pair of spaced elongated frame members 82, the opposite ends of each of which are provided with wheels 83. Each of the wheels 83 is proportioned to ride within the channel of outer ramp rails 51, with downward movement of the mobile work station 81 depending on gravity. The work station is drawin up the incline by an electric motor 84 which, through an appropriate winch pulley (not shown) a cable 86, is under the control of an operator 87 standing on work platform 88. Supported on frame members 82 of the mobile work station are a pair of transversely spaced uprights 89, which are connected at their upper ends by a work table 91 of the rotatable ball variety which permits placement of a container thereon by the workman 87 and manipulation in any given direction.

Adjacent work table 91, the work station is provided with a series of free horizontal rollers 92, over which the container may roll upon being pushed by the workman. From the rollers 92, each container is discharged onto a short endless conveyor belt 93. The endless belt 93 is drawn over pulleys 94 and 96 by a geared-down motor 97 arranged to drive the belt. From the motor-driven conveyor belt 93, each of the containers 32 is picked up by the main elevator conveyor 56 through abutment of a cleat 58 with a container.

As previously discussed, containers are selected from specific bins in response to a roll of labels which has been arranged in a programmed manner through use of computer techniques. The roll of labels is preferably mounted in a viewer 101 which works in association with a labeling device 102. This cooperative relationship between the viewer 101 and labeler 102 is best shown and described in Pat. No. 3,379,321.

Briefly, as a container is selected from one of the bins by the workman and is placed on the universal ball table 91, the label corresponding to the commodity in the container is transferred from the viewer portion of the mechanism to the labeler portion of the mechanism so that, as the container moves past the labeler 102 on rollers 92, an automatic pusher mechanism (not shown) effects labeling of the container with the appropriate label, the label bearing data designating the commodity and destination of the container.

As explained in the above-mentioned patent, the data container on the label may be of different types so that portions of the information thereon may be both read by an individual and read by a machine programmed to shunt the container into a specific receiving dock.

It will thus be seen that the workman 87 standing on platform 88 may control the up and down movement of the mobile work station 81 and simultaneously control the forward or backward movement of the mobile carriage 34. By independently controlling these two movements the workman can position himself anywhere along the rack, so as to select containers from any given bin. Thus, under appropriate control, the workman can place himself in the position illustrated in dash lines in FIG. 4 at the lower left-hand corner of the view. In this position he may reach containers stored in the lowermost series of bins. On the other hand, as necessary, the workman can manipulate the controls so that he is elevated to the position illustrated in full lines in FIG. 4.

As previously discussed, it is sometimes preferable that the mobile carriage 34 be utilized not only to select individual containers from specific bins and send them on their way to a sorting station, but that it be used also for loading bins with pallet-sized loads of containers. For this purpose, the workman may control the mobile work station so that it assumes its lowermost or substantially lower most position to the left of the dash line position illustrated in FIG. 3. While held in this position, the pallet-sized load of containers may be placed by a forklift truck or jitney upon a pallet platform 106 which is conveniently attached to and rigidly supported on the rear edge of the work platform 88 as shown best in FIG. 4.

The pallet 22 rests upon a pair of spaced and parallel roller assemblies, each comprising a pair of spaced angle bars 107 and each pair of angle bars 107 has journaled therebetween a series of rollers 108. A pallet placed on the roller assemblies as indicated in dash lines in FIG. 4 may be moved transversely with respect to the aisle so that empty pallets may be conveniently withdrawn from bins and loaded on the pallet platform. In the alternative, the loaded pallets on the pallet platform 106 may be rolled onto the rack roller assemblies 23 illustrated in FIG. 7. The spacing of the roller assemblies on the pallet platform is proportioned so that the pallet platform roller assemblies lie opposite the ends of the rack roller assemblies 23 mounted in the bins.

It will thus be seen that with a loaded pallet on the pallet platform, the operator may adjust the mobile work station to any desired bin, adjusting his controls until the roller assemblies on the pallet platform lie directly opposite and in axial alignment with the rack roller assemblies 23 in a selected bin. Then, by the application of only a slight amount of force, the workman may cause the loaded pallet to roll into the selected bin. Once the loaded pallet is in position within the bin, the workman then replaces pin 29 in socket 31 so as to lock the pallet against outward movement. The mobile carriage thus performs a double function in this aspect of the invention, saving floor space because of the capability of placing a pair of racks back-to-back so that they may be filled from the front, while being used under the control of the same operator to make selections of containers from specific bins.

In FIGS. 5 and 6 another embodiment 112 of the warehousing equipment of the present invention is illustrated. The mechanisms of this embodiment, that are similar to the mechanisms of the FIGS. 1–4 embodiments, will be identified by identical reference numerals followed by a prime. The vehicle 34' of FIG. 6 differs from vehicle 34 in that the supporting wheels 42' travel along the floor rather than on tracks, and horizontal wheels 114 are secured to the frame of vehicle 34' and bear against the lower edge of the bin structures to guide the vehicle in the aisle. The worker's station 81' differs from work station 81 only in the substitution of an endless belt conveyor 115 for the ball table 91, roller conveyor 92 and belt 93 of station 81. The distinctive feature of this modification is the provision at the upper end of the elevator of a transition conveyor 116 that permits the article being elevated to continue in the same general direction that it is moving as it comes up the elevator conveyor 56'. The transition conveyor 116 comprises a support platform 120 that has a floor 121 and side walls 122. One portion of the rear edge of the floor is connected to the floor of the frame of elevator conveyor 56', in the manner shown in FIG. 8 for the transition conveyor 61, and a portion of the forward edge of the floor carries two rigid arms 124 and 125 that rotatably support grooved wheels 128. The wheels ride in spaced tracks 130 and 131 that are disposed on opposite sides of a powered endless belt conveyor 132. With this arrangement the support platform 120 is supported by the frame of the elevator conveyor and by the tracks 130 and 131. The arms 124 and 125 also rotatably support a plurality of free rollers 133 that are arranged to define a descending gravity conveyor section arranged to guide articles down onto the powered conveyor belt 132.

Two right-angle, endless belt conveyor sections 135 and 136 are mounted on the floor of the support platform 120. Each of these sections may be of the type disclosed in the U.S. patent to Fry No. 3,044,603 and, in general, each section comprises an endless belt trained over tapered pulleys one of which is driven by an electric motor 138. It will be evident that articles elevated on conveyor 34' are deposed on the right angle conveyor 135, which transfers the article to conveyor 136 which, in turn, directs the article down the rollers 133 onto conveyor 132. The conveyor 132 is arranged to deliver the articles one by one to a sorting area where they are directed individually to desired accumulating or loading stations.

From the foregoing description it will be evident that the present invention provides an efficient system for selecting and dispatching articles in a warehouse. The unique inclined conveyor is very simple in construction and does not require complicated vertically moving article pick-up forks or the like, and serves the dual function of acting as a conveyor and providing a particularly stable transporting and maneuvering carrier for the operator's work station. The work station itself is of unique construction and provides an effective means for moving along the aisle and permitting the operator to gain access to bins at various elevations and at various positions longitudinally in the aisle.

Although the best mode contemplated for carrying out the present invention has been herein shown and described, it will be apparent that modification and variation may be made without departing from what is regarded to be the subject matter of the invention as set forth in the apended claims.

Having completed a detailed description of the invention so that those skilled in the art could practice the same, I claim:

1. A vehicle for supporting an order-picking worker in an aisle of a warehouse which has structure providing open-front compartments facing the aisle at various elevations and at various locations along the aisle, said vehicle comprising: a frame mounted for movement along the aisle and having an upwardly inclined support section extending longitudinally of the aisle from a lower to a higher elevation, said upwardly inclined section of said frame including an endless inclined conveyor having conveying means movable upwardly along said section, a carriage mounted on said support section for movement upwardly and downwardly along said section past the open front of compartments at different elevations and at various locations longitudinally of the aisle, means defining a worker's station on said carriage, and power means for moving said carriage along said inclined support section to move the worker with a combined vertical and horizontal movement to positions adjacent selected compartments, said vehicle including second power means under the control of the worker on said carriage and connected to said frame for moving said frame along said aisle, the coordinated actuation of said two power means being effective to move said carriage and the worker thereon to selected positions adjacent the open front of compartments at various elevations and various locations along the aisle, a substantially horizontally conveying mean on said carriage adjacent the worker's station and having a discharge end in operative relation to the said endless conveyor of said inclined support section to deliver articles thereto in all positions of said carriage along said section.

2. A vehicle according to claim 1 wherein said frame has a base substantially as long as the distance the worker's station moves in a horizontal direction when moving along said inclined support section whereby a stable foundation is provided for said station in all its operating positions.

3. A vehicle according to claim 1 including a curved discharge conveyor connected to the upper end of said inclined support section for movement therewith longitudinally of the aisle of the warehouse.

4. A vehicle according to claim 3 wherein said discharge conveyor defines a 180 degree reversing conveying path.

5. A vehicle according to claim 4 wherein said discharge conveyor is a gravity roller conveyor.

6. A vehicle according to claim 1 including means for guiding the movement of the vehicle along the aisle.

7. A vehicle according to claim 6 wherein said guide means comprises grooved wheels mounted on said frame and coacting with tracks on the floor of the warehouse.

8. A vehicle according to claim 1 including a pallet support attached to said carriage for movement therewith up and down said inclined support section.

9. A vehicle according to claim 1 wherein said worker's station and said pallet support are supported in cantilever manner from said carriage.

References Cited

UNITED STATES PATENTS

| | | | |
|---|---|---|---|
| 1,688,500 | 5/1928 | Gillespie | 187—10 |
| 3,343,692 | 9/1967 | Arnot | 214—16.4 |

FOREIGN PATENTS

| | | |
|---|---|---|
| 1,143,007 | 1/1963 | Germany. |
| 1,035,237 | 7/1966 | Great Britain. |

GERALD M. FORLENZA, Primary Examiner

RAYMOND B. JOHNSON, Assistant Examiner

U.S. Cl. X.R.

187—10; 198—233, 96